Patented July 11, 1944

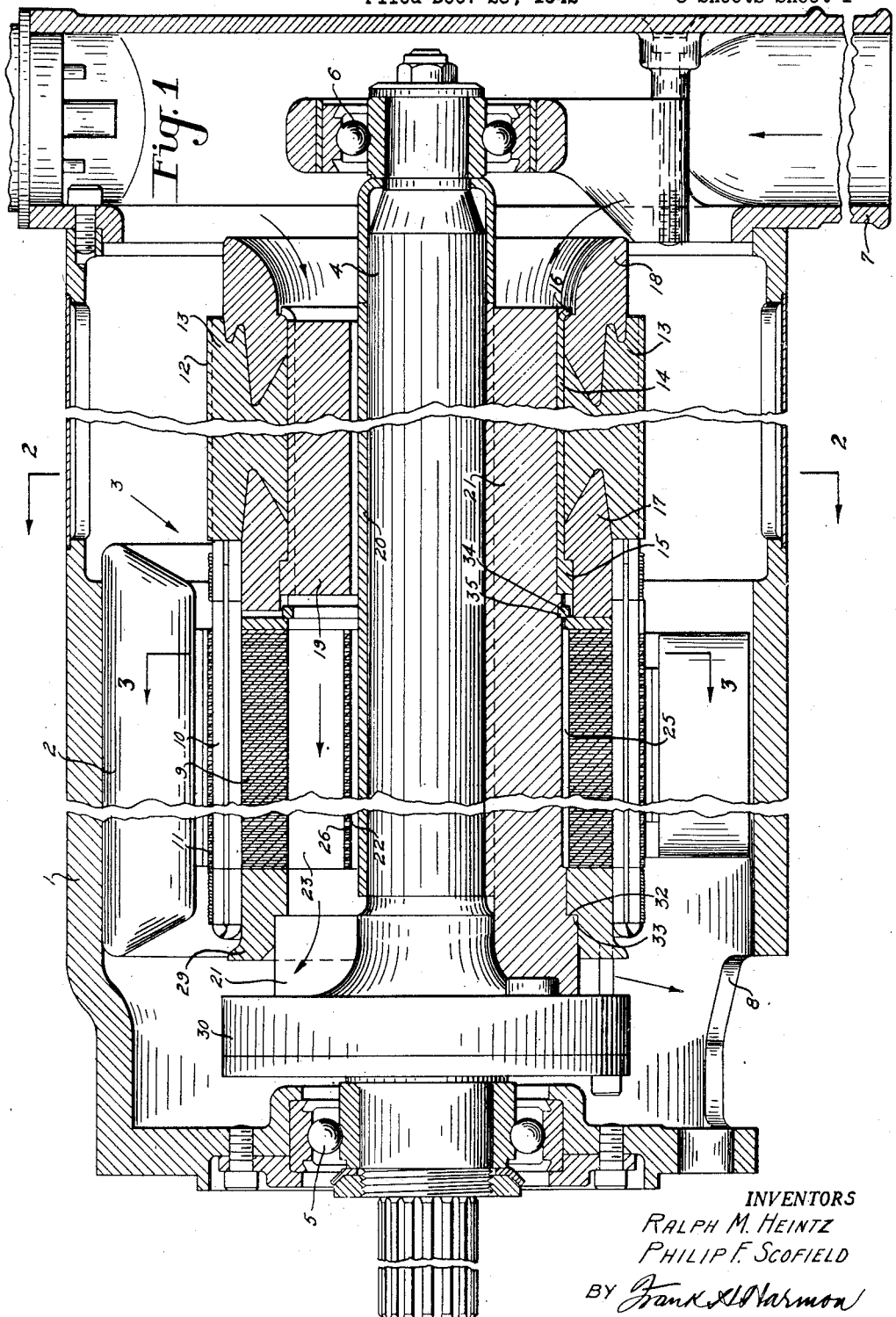
INVENTORS
RALPH M. HEINTZ
PHILIP F. SCOFIELD
BY Frank H Harmon
ATTORNEY

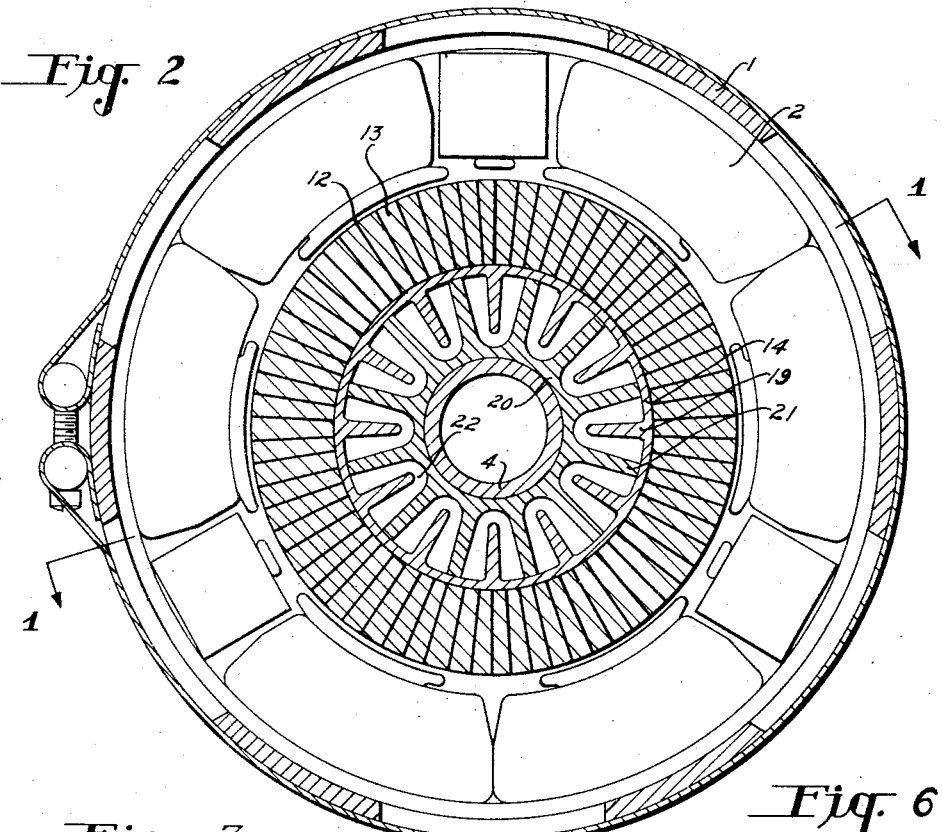
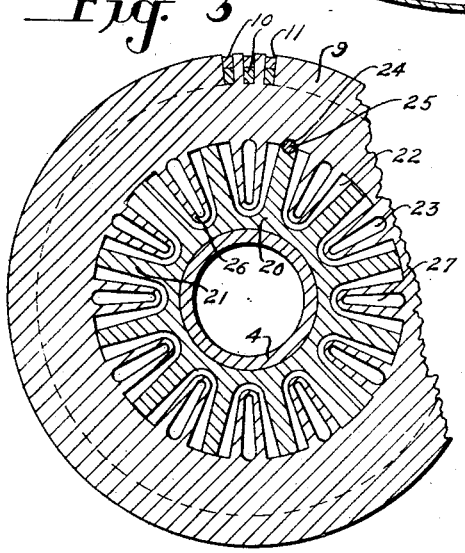
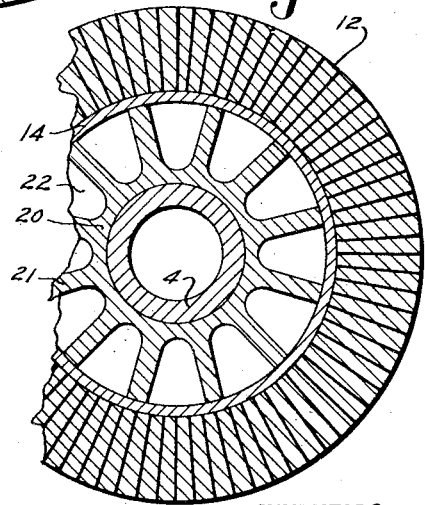

2,353,336

UNITED STATES PATENT OFFICE 2,353,336

ARMATURE CONSTRUCTION

Ralph M. Heintz, Cleveland, and Philip F. Scofield, Cleveland Heights, Ohio, assignors to Jack & Heintz, Inc., Bedford, Ohio, a corporation of Ohio Application December 23, 1942, Serial No. 469,892

2 Claims. (Cl. 171—252)

This invention relates to an improved armature construction for electrical machines having passageways for a cooling medium through the body of the armature.

The general object of the invention is to provide an improved air cooled armature core and commutator, and a particular object is to provide a novel construction to support an armature core and commutator in good heat transferring relation to an air stream moving therethrough.

The invention is best understood with reference to the appended drawings in which:

Figure 1 is a longitudinal sectional view through an electric generator embodying the principles of the invention, this view being taken approximately on the line 1—1 of Figure 2;

Figure 2 is a cross sectional view taken on the line 2—2 of Figure 1;

Figure 3 is a cross sectional view through the armature core, taken on the line 3—3 of Figure 1;

Figure 6 is a cross sectional view through the commutator, showing a modified commutator supporting structure.

Figure 4:
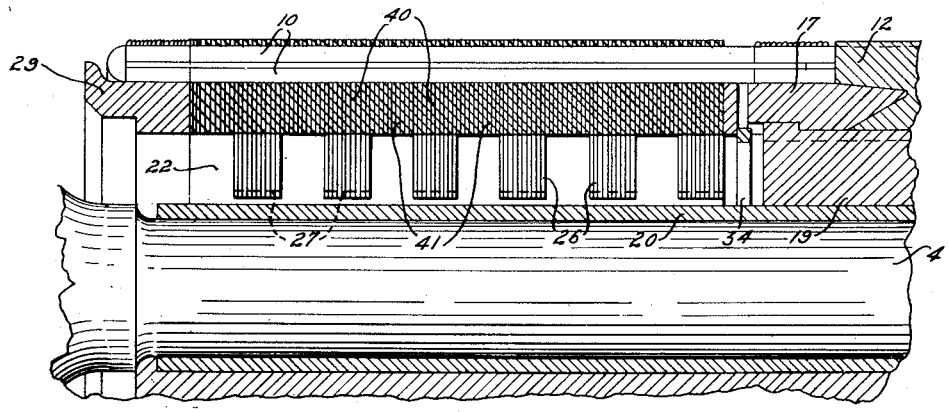
Figure 4 is a partial longitudinal sectional view showing a modified core structure.

The machine illustrated in longitudinal section in Figure 1 is a high output generator for aircraft requiring the removal of a large amount of heat by means of a forced circulation air cooling system. The housing comprises a generally cylindrical casing 1 having a stationary field structure 2 and an armature 3 mounted on a shaft 4 for rotation in bearings 5 and 6. The casing is provided at one end with an air inlet 7 adapted to be supplied with air under pressure, and outlet openings 8 at the other end for discharging said air from the casing. The brushes and brush tensioning mechanisms are omitted for clearness in illustrating the principles of the invention.

The armature comprises a core built up from a stack of laminations 9 carrying conductors 10 in slots 11, and a commutator 12. The commutator 12 comprises a plurality of bars 13 built up on a hollow commutator shell in the form of an extruded rivet member 14 having a shoulder 15 on one end and a riveted or swaged extremity 16 on the other end for clamping the rings 17 and 18 into interlocking engagement with the bars 13. The rivet member 14 is provided with internal radial fins 19 as shown. An extruded member 20 is pressed on the shaft 4 and carries the commutator on radial fins 21 which may engage the interior of rivet member 14 in a press fit as shown in Figure 2. The members 14 and 20 are preferably formed from a good heat conducting, extrudable material, such as a suitable aluminum alloy, to obtain rapid heat transfer from the bars 13 to the cooling air in the passageways 22 defined by the fins 21. It is of course understood that the usual insulation is provided between adjacent bars 13 and between these bars and the rivet member 14.

Figure 3 is a cross sectional view through the armature core showing the structure for transferring heat from the core 9 and windings 10 to the cooling air moving through the passageways 22 in the body of the core. The stack of laminations 9 is carried upon the fins 21, each lamination being grooved as at 24 and keyed to one of the fins as shown at 25. Extending between the fins 21 are tongues 26 in the laminations having openings 27 therein providing additional passageways 23 for cooling air within the laminated core itself. Air introduced into the intake 7 under pressure is thereby caused to pass through passageways 22 between the heat conducting fins 19 and 21 interiorly of the commutator, thence through the passageways 22 and 23, interiorly of the armature core, leaving the interior of the armature between the ring 29 and a flange 30 on the shaft 4.

The function of the ring 29 is to form a base for the stack of laminations 9, a shoulder 32 on the ring 29 abutting shoulders 33 on the fins 21. The other end of the stack is secured by a snap ring 34 in slots 35 in said fins.

Figure 5:
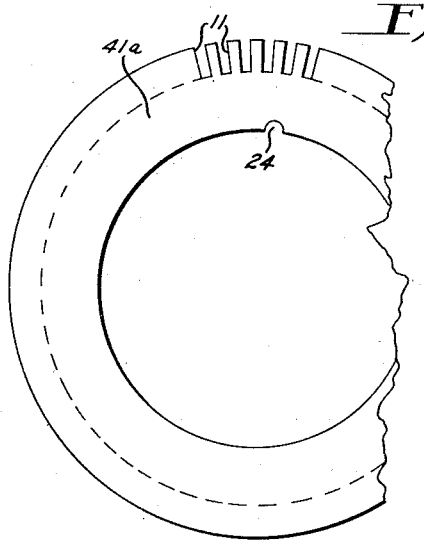
Figure 5 is a view of a lamination from one of the groups 41 in Figure 4.

Figure 4 is a partial longitudinal sectional view showing a modified arrangement of armature laminations. In this arrangement two types of laminations are used in alternating groups. The groups 40 comprise laminations of the type shown at 9 in Figure 3 while the groups 41 are of the type shown at 41a in Figure 5. Thus the openings 27 do not produce a continuous passageway through the core, the groups of tongues 26 merely serving as baffles to create turbulence in the air flow through passageways 22.

Figure 7:
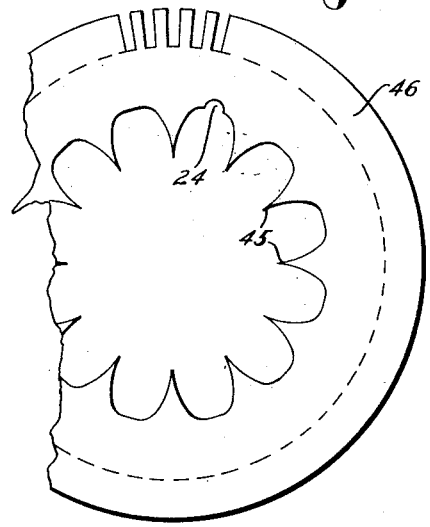
Figure 7 is a view of a modified form of core lamination.

In Figure 6 is shown a modified construction omitting the fins 19 on the rivet member 14 to allow a greater flow of air through passageways 22. To this end, also, the tongues 26 on the laminations may be omitted, or substantially reduced as by substituting cusps 45 as shown on the lamination 46 in Figure 7. The cusps 45 produce turbulence and transfer heat from the core to the cooling medium without obstructing the air flow as much as tongues 26.

The provision at the intake 7 for receiving an air pressure conduit does not preclude the possibility of employing fan means on the armature 3 for moving air therethrough, either to supplant or to supplement any external air moving means, but the present invention is primarily concerned with the problem of heat transfer from the armature to the air stream moving therethrough regardless of the motivating agency or agencies.

While the invention has been described in connection with a high output generator for aircraft, this embodiment is used for illustrating the principles of the invention and not in a limiting sense. The invention is also applicable to the armatures of motors and other electrical machines requiring the dissipation of large amounts of heat from revolving parts. Various changes and modifications may be made, and certain features may be used without others, it being understood that the invention is to be limited only by the scope of the prior art and the appended claims.

We claim:

1. In an air cooled armature construction, a shaft, a plurality of external fins on said shaft, and a stack of armature laminations carried by said fins, said laminations having aligned apertured tongues extending between said fins to provide air passageways between said tongues and said fins and also through said apertures.

2. An air-cooled armature construction comprising a shaft, a tubular heat conducting member surrounding said shaft in a press fit so as to be structurally integral therewith, a plurality of thin, radially directed and longitudinally extending fins on said member defining open-ended longitudinal cooling passages through the entire length of said armature, a unitary commutator assembly carried by a hollow tubular commutator shell of good heat conducting material, said shell surrounding said fins in a press fit so as to be structurally and thermally integral therewith, and a stack of armature laminations mounted on said fins in good heat conducting relation therewith and in good heat transfer relation with a cooling medium in said passages, said tubular heat conducting member, including said fins, and said tubular commutator shell, being composed of a material lighter in weight and of better heat conducting properties than the materials of said shaft and laminations to effect a reduction in weight and an increase in output of said armature.

RALPH M. HEINTZ.
PHILIP F. SCOFIELD.